United States Patent
Sano

(10) Patent No.: US 7,672,980 B2
(45) Date of Patent: Mar. 2, 2010

(54) SYSTEM, APPARATUS AND METHOD FOR READING DATA

(75) Inventor: Yoshitake Sano, Machida (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 11/339,465

(22) Filed: Jan. 26, 2006

(65) Prior Publication Data
US 2007/0130431 A1 Jun. 7, 2007

(30) Foreign Application Priority Data
Nov. 24, 2005 (JP) ............................. 2005-338888

(51) Int. Cl.
*G06F 12/00* (2006.01)
*G06F 17/30* (2006.01)

(52) U.S. Cl. ..................... 707/204; 707/205

(58) Field of Classification Search ........................ None
See application file for complete search history.

(56) References Cited

U.S. PATENT DOCUMENTS

| | | | | |
|---|---|---|---|---|
| 5,315,708 | A * | 5/1994 | Eidler et al. | 711/119 |
| 5,487,160 | A * | 1/1996 | Bemis | 711/114 |
| 5,737,742 | A * | 4/1998 | Achiwa et al. | 711/103 |
| 5,903,724 | A * | 5/1999 | Takamoto et al. | 709/200 |
| 5,953,729 | A * | 9/1999 | Cabrera et al. | 707/204 |
| 6,038,636 | A * | 3/2000 | Brown et al. | 711/103 |
| 6,085,298 | A * | 7/2000 | Ohran | 711/162 |
| 6,772,290 | B1 * | 8/2004 | Bromley et al. | 711/118 |
| 6,857,059 | B2 * | 2/2005 | Karpoff et al. | 711/209 |
| 2001/0054110 | A1 * | 12/2001 | Kikinis | 709/239 |
| 2005/0165972 | A1 * | 7/2005 | Miyata et al. | 710/1 |
| 2008/0098049 | A1 * | 4/2008 | Pillai et al. | 707/204 |

OTHER PUBLICATIONS

Veritas Software Corporation, Veritas Backup Exec 9.0 for Windows Servers, Jun. 2002, pp. 5.*
"Veritas Netbackup 5.0. System Administrator's Guide vol. 1 Unix", pp. 118-120, Jul. 2004, Veritas Software Corporation.

* cited by examiner

*Primary Examiner*—Pierre M Vital
*Assistant Examiner*—Rachel J Lee
(74) *Attorney, Agent, or Firm*—Antonelli, Terry, Stout & Kraus, LLP.

(57) ABSTRACT

A data read apparatus which, when reading data in a data region sequentially, consults information pieces indicative of positions of information pieces concerning files to identify a position of an information piece concerning a file corresponding to a data piece at a reading position, consults an information piece concerning the file at the identified position to calculate an output position in a temporary memory region to which the data is to be outputted, delivers the data read out of an area in the data region to the output position, decides whether files corresponding to outputted data are all present in the temporary memory region and delivers the files to a backup region in a unit of file when the presence of all files is determined.

16 Claims, 9 Drawing Sheets

FIG.3

101 PBN / FILE INFORMATION CONVERSION TABLE

| PBN (102) | POINTER TO FILE INFORMATION (103) |
|---|---|
| 0 | 10000 |
| 1 | 10004 |
| 2 | 10000 |
| 3 | 0 |
| ⋮ | ⋮ |

FIG.4

104 Inode INFORMATION TABLE

106 EXTENT INFORMATION

| FILE NAME (105) | EXTENT NUMBER (403) | EXTENT HEAD POSITION / BLOCK NUMBER (404) | | EXTENT HEAD POSITION / BLOCK NUMBER (405) | | ... |
|---|---|---|---|---|---|---|
| File.A | 1 | 1 | 1 | | | |
| File.B | 2 | 2 | 1 | 0 | 1 | |
| ⋮ | ⋮ | ⋮ | ⋮ | ⋮ | ⋮ | |

FIG.5

501 TEMPORARY MEMORY AREA MANAGING TABLE

| FILE INFORMATION ADDRESS (502) | DATA TEMPORARY MEMORY AREA HEAD ADDRESS (503) | BLOCK NUMBER (504) |
|---|---|---|
| 10004 | 00010000 | 2 |
| 10000 | 00020000 | 1 |
| ⋮ | ⋮ | ⋮ |

SYSTEM, APPARATUS AND METHOD FOR READING DATA

INCORPORATION BY REFERENCE

The present application claims priority from Japanese application JP2005-338888 filed on Nov. 24, 2005, the content of which is hereby incorporated by reference into this application.

BACKGROUND OF THE INVENTION

The present invention relates to a technique of reading data from a disk through sequential read and outputting readout data in a unit of file.

Conventionally, in case of reading data recorded on a disk during execution of, for example, backup, there is available a technique for performing sequential read in a unit of file regardless of recording positions on the disk (see Non-Patent Document: "VERITAS NetBackup™ 5.0 System Administrator's Guide Vol. 1 UNIX" pp. 118-120, July, 2004, published by VERITAS Software Corporation).

Also available is a technique of reading data from the head of a disk through sequential read and recording readout data on a backup unit.

SUMMARY OF THE INVENTION

According to the technique described in the Non-Patent Document as above, the readout data can be outputted in a unit of file but much time is consumed for a process of reading data in a unit of file. Accordingly, the conventional technique is effective if the environment is such that the performance of the disk is high and the performance of the backup unit is low. But, when taking into account the recent situation that a magnetic tape storage capable of writing data at a high speed has been developed as the backup unit, there arises a problem that a state of waiting for reading from the disk takes place and the full use of the performance of the backup device cannot be made.

And also, according to the technique for reading data from the head of the disk through sequential read, the performance of the disk can be assured maximally by reading data sequentially from the head of the disk but the disk is not accessed in a unit of file to thereby lead to a problem that readout data cannot be recorded in a unit of file on the backup unit and restoration of data in a unit file is difficult to achieve.

Accordingly, by considering that, when data in a data region recorded on a disk are read sequentially during execution of, for example, backup, the full use of the performance of the disk (for permitting data to be read out of the disk at a high speed) can be made in the course of data read from the disk through sequential read, the present invention has for its object to ensure that data can be read out of the disk at a high speed and can be outputted in a unit of file.

To accomplish the above object, a system for reading data according to this invention comprises a disk device including a data region for storing data representing read targets, a tape unit including a backup region for data and a data read apparatus for reading data in the data region and outputting the data to the backup region, wherein the disk device manages pieces of information concerning files corresponding to pieces of data stored in the data region and pieces of position information on the information pieces concerning the files, and the data read apparatus includes a temporary memory region for temporarily storing data read out of the data region and a processor, and wherein when reading a data piece from an area of the data region sequentially, the processor consults the position information on the information concerning a file to identify a position of an information piece concerning the file corresponding to the data piece at a reading position, consults the information piece concerning the file at the identified position to calculate an output position in the temporary memory region to which the data piece is to be outputted, delivers the data piece read out of the data area to the calculated output position, decides whether files corresponding to outputted data pieces are all present in the temporary memory region and when presence of all files is determined, delivers the files to the backup region in a unit of file.

With this construction, the data read apparatus can read data at a high speed from the data region through sequential read and can deliver readout data to the backup region in a unit of file.

According to this invention, data can be read out of a disk and the readout data can be delivered in a unit of file.

Other objects, features and advantages of the invention will become apparent from the following description of the embodiments of the invention taken in conjunction with the accompanying drawings.

BRIEF DESCRIPTION OF THE DRAWINGS

FIG. 3 shows a table for storing recording positions and addresses to file information.

FIG. 4 shows a table storing file information.

FIG. 5 shows a table storing information for management of a temporary memory region.

DESCRIPTION OF THE EMBODIMENTS

First Embodiment

The best mode for carrying out the present invention will now be described in greater detail with reference to the accompanying drawings.

Figure 1:
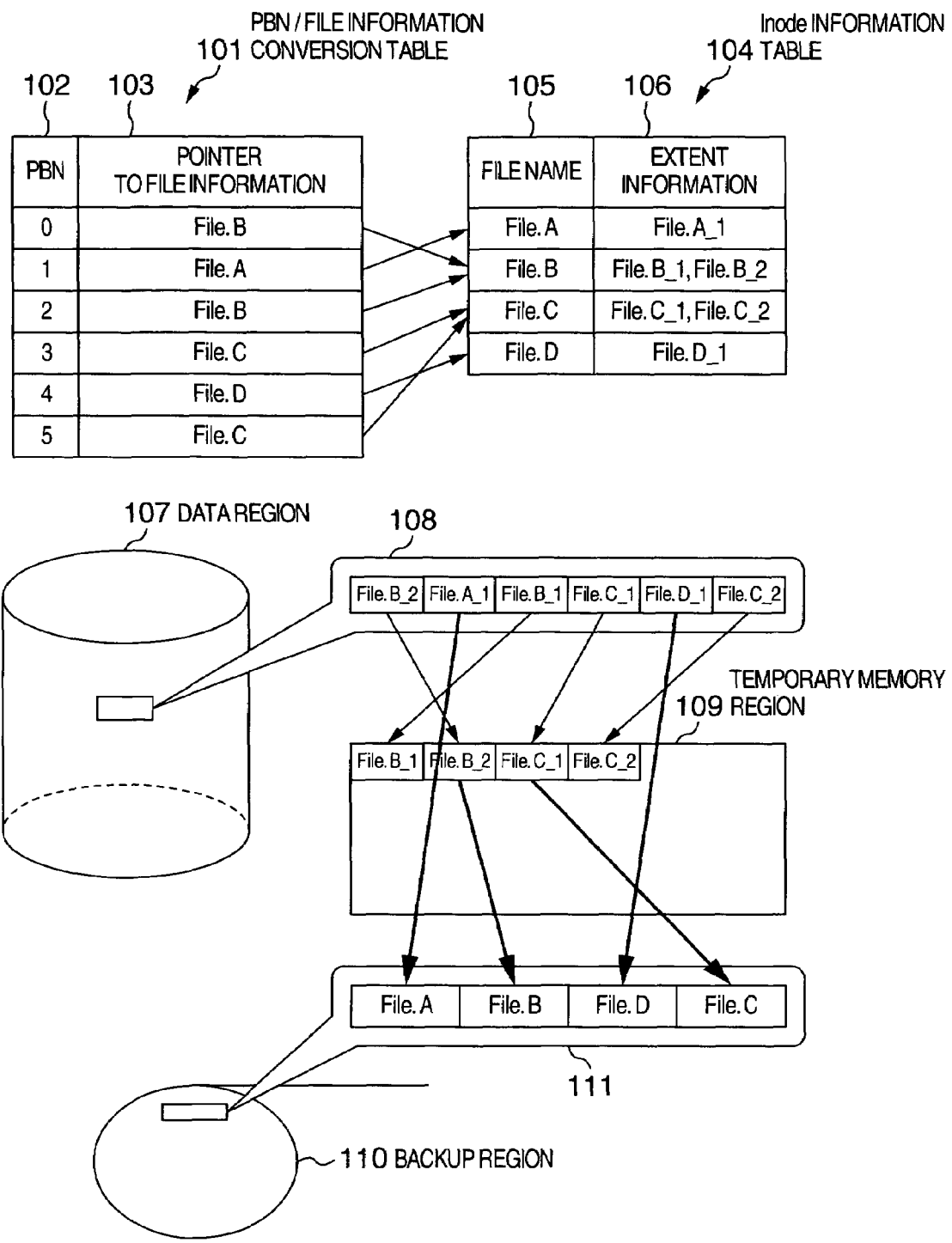
FIG. 1 is a diagram useful to explain an example of operation of an apparatus for reading data (server) according to a first embodiment of the present invention.

Referring first to FIG. 1, an example of operation of an apparatus for reading data (hereinafter referred to as a server) according to the present invention will be explained.

Illustrated in FIG. 1 are a PBN (physical block number)/file information conversion table 101, an Inode information table 104, a data region 107, a temporary memory region 109 and a backup region 110.

The data region 107 is for retaining backup target data.

The temporary memory region 109 is for temporarily retaining or saving data.

Further, the backup region 110 provides a region in which backup data is retained.

Although the server is not shown in FIG. 1, it is herein assumed that structurally, the server reads data from the data region 107 and outputs retention data to the backup region 110.

The PBN/file information conversion table 101 includes a field 102 for PBN and a field 103 for pointer to file information. The PBN referred to herein is short for physical block number and in the present invention, indicates relative position numbers from the disk head in a unit of minimum allocation in a file system. And also, the field 103 for pointer to file information stores a head address of an area in data region in which a piece of information concerning a file (file information piece) is stored. The Inode information table 104 is used to manage the file information pieces. By using the PBN/file information conversion table 101, a file information piece can be consulted from a recording position of data on the data region 107. The PBN/file information conversion table 101 will be detailed later by making reference to FIG. 3.

The Inode information table 104 is part of the file system and is used to manage the file information. The Inode information table 104 includes file name 105 and extent information 106. Here, the extent means a logical unit allotted as a memory area on the data region 107. The extent information 106 provides information concerning the extent and is used herein for management as to how many divisions each file is divided into and which ones of data area the divisions are recorded in. In this instance, the Inode information table 104 is used but an area in which metadata of, for example, file information is recorded can substitute for the Inode information table. Details of the Inode information table 104 will be described later by making reference to FIG. 4. It is to be noted that the extent may sometimes be simply called data.

Operation of the server of the invention will be described in order with reference to FIG. 1.

The server 210 (see FIG. 2) changes the Inode information when the recording position of a file is changed at the time that the file is prepared/erased/extended/contracted and in this phase, an entry of the PBN/file information conversion table 101 corresponding to the changed recording position is also changed. This allows file information (extent information 106) to be always accessed easily and speedily from the recording position on data region 107.

As backup starts, the server 210 (see FIG. 2) sequentially reads data in the data region from the head. For convenience of easily understandable expression, an explanation will be given by using an enlarged part 108 of the data region and an enlarged part 111 of the backup region. It will be appreciated that the backup region represents a high-speed tape device or disk device. When reading data in data region 107 sequentially, the server 210 uses the PBN/file information conversion table 101 to consult file information (extent information 106) from individual recording positions and if a readout file is divisional (divided), retains or saves the readout file in the temporary memory region 109. When files to be retained are all present in the temporary memory region 109 (as for a file divided into a plurality of extents, when all of the extents are present), the files are delivered to the backup region 110. In case a readout file is undivided, the temporary memory region 109 is not used and the file is delivered as it is to the backup region 110. By repeating this operation until the last data area in the data region 107 is reached, data can be delivered from the data region 107 to the backup region 110 in a unit of file through sequential read of the data.

A description will be given by referring to a concrete example in which files recorded on the data region 107 include files File.A and File.D each undivided and files File.B and File.C each divided into two on the Inode information table 104. Supposedly, the files File.B_ 2, File.A_ 1, File.B_ 1, File.C_ 1, File.D_ 1 and File.C_ 2 are recorded in this order as exaggeratedly illustrated at 108.

During a backup operation, the server 210 first reads the file File.B_ 2 from the data region 107. By consulting pointer 103 to file information corresponding to the value of PBN 102 being "0" on the PBN/file information conversion table 101, the server can acquire extent information 106 corresponding to the file File.B on the Inode information table 104. By making reference to the extent information 106 corresponding to the File.B, the server 210 determines that the File.B is divided and retains or saves the File.B_ 2 representing data read out of the data region 107 at a corresponding site in the temporary memory region 109. A method for calculating the corresponding site in the temporary memory region 109 will be detailed later with reference to FIG. 6.

Subsequently, the server 210 read the next data represented by the file File.A_ 1. By consulting pointer 103 to file information corresponding to the value of PBN 102 being "1" on the PBN/file information conversion table 101 (a value resulting from addition of "1" to "0" during the previous read), the server 210 can acquire extent information 106 corresponding to the File.A on the Inode information table 104. By consulting the extent information 106 corresponding to the File.A, the server 210 determines that the file File.A is undivided and delivers, as the file File.A, the file File.A_ 1 representing data read out of the data region 107 to the backup region 110.

Subsequently, the server 210 reads the next data file File.B_ 1. The server 210 determines in a similar way that the file File.B is divided and delivers the file File.B_ 1 to the temporary memory region 109. Then, the server 210 determines that files of the File.B are all present in the temporary memory region 109 and delivers, as the file File.B, the files File.B_ 1 and File.B_ 2 representing data read out of the data region 107 to the backup region 110 from the temporary memory region 109. A method for deciding whether all files are read by the server 210 will be detailed later with reference to FIG. 6.

Thereafter, the server 210 reads the next data file File.C_ 1. The server 210 determines in a similar way that the file File.C is divided and delivers the file File.C_ 1 representing data read out of the data region 107 to the temporary memory region 109.

Then, the server 210 reads the next data represented by the file File.D_ 1. The server 210 determines in a similar way that the file File.D is undivided and delivers, as file File.D, the file File.D_ 1 representing the data read out of the data region 107 to the backup region 110.

Then, the server 210 reads the file File.C_ 2 representing the next data. The server 210 determines in a similar way that the file File.C is divided and delivers, also in a similar way, the file File.C_ 2 to the temporary memory region 109. Then, the server determines that files of File.C are all present in the temporary memory region 109 and delivers, as the file File.C, the files File.C_ 1 and File.C_ 2 representing data read out of the data region 107 to the backup region 110 from the temporary memory region 109.

By repeating the operation as above, the data can be read sequentially from the data region 107 and delivered to the backup region 110 in a unit of file as exaggeratedly illustrated at part 111 of backup region.

Figure 2:
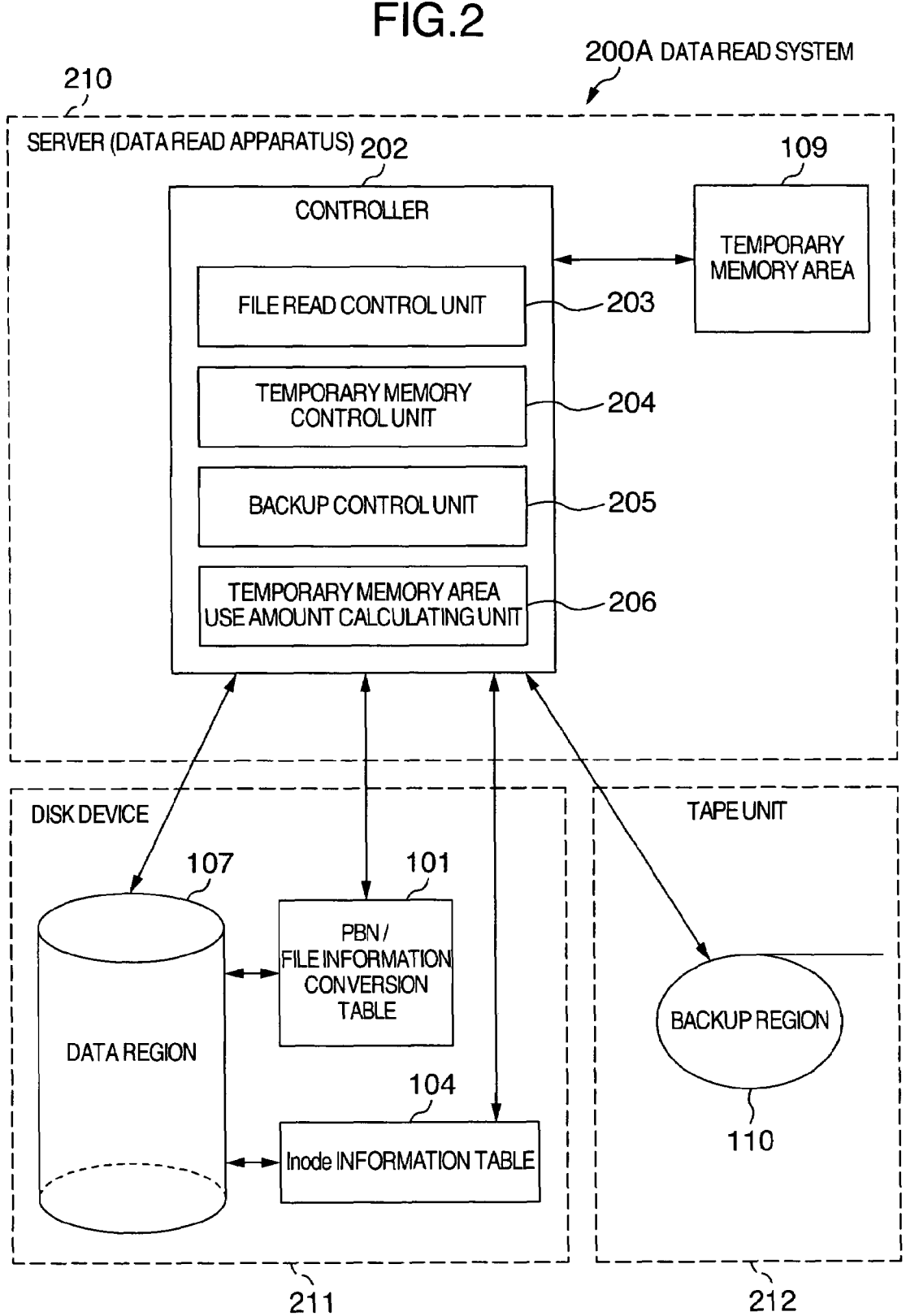
FIG. 2 is a diagram useful to explain the overall construction of a system for reading data in the first embodiment of the invention.

Referring now to FIG. 2, the overall construction of a system for reading data according to the invention will be explained.

As shown in FIG. 2, the data read system as generally designated at 200A comprises a server 210, a disk device 211 and a tape unit 212.

The disk device 211 includes the PBN/file information conversion table 101, data region 107 and Inode information table 104. The data region 107 provides an area serving as a data read target, the Inode information table 104 is for managing the file information and the PBN/file information conversion table 101 is a table for managing a position from the head in the data region 107 (hereinafter referred to as a PBN) and a pointer to file information related to data stored at the position.

The tape unit 212 includes the backup region 110. The backup region 110 provides an area of destination to which data the server 210 reads out of the data region 107 is delivered.

The server 210 includes a controller (processor) 202 and the temporary memory region 109. The temporary memory region 109 provides an area to which a file divisionally recorded on the data region 107 is temporarily saved. The controller 202 controls various kinds of control units including a file write control unit 203, a temporary memory control unit 204, a backup control unit 205 and a temporary memory area use amount calculating unit 206.

The file write control unit 203 performs a process for updating the PBN/file information conversion table 101 when the recording position of a file or data is changed.

The temporary memory control unit 204 is adapted to control securing/release of an area (in temporary memory region 109) for temporarily recording a file.

The backup control unit 205 is for reading data from the data region 107 and writing the data to the backup region 110 by using the temporary memory region 109.

The temporary memory area use amount calculating unit 206 is for calculating the use amount of an area in temporary memory region 109. If the area use amount in the temporary memory region 109 need not be calculated, the temporary memory area use amount calculating unit 206 can be omitted.

It is presupposed that as the data region 107, a file system is structured on the disk. It is also presupposed that during execution of backup, the static state in which data on the disk is not updated is kept.

Information inputted/outputted among the components of server 210, disk device 211 and tape unit 212 will be described with reference to FIG. 2. The server 210 transfers a physical address at which read is executed and a read size to the disk device 211. Receiving the read physical address and read size from the server 210, the disk device 211 acquires the contents recorded on a corresponding area and transfers it to the server 210. Then, the server 210 takes over the file contents and file related information (related information recorded on the file system such as file name) to the tape unit 212 sequentially to carry out backup of the corresponding file. The tape unit 212 may be of the same hardware as the server 210 (constructed in the same console) or a separate server (a different apparatus) connected via a network but information to be exchanged remains unchanged.

Turning to FIG. 3, the aforementioned PBN/file information conversion table 101 (see FIG. 1) is structured as shown therein. The PBN/file information conversion table 101 includes the PBN 102 and the pointer 103 to file information. In the PBN/file information conversion table 101, entries are prepared in a unit of the minimum allocation to the data region 107 on the file system. In the item 103 of pointer to file information, individual entries in FIG. 3 indicative of head addresses are stored as head addresses of file information pieces to easily determine which one of files each entry of PBN is allocated to. For example, such a fixed value as zero or a maximum value is set to an unallotted area to make it discriminative. Here, the item 102 of PBN is indicated in the PBN/file information conversion table 101 for convenience of explanation but the size of an area corresponding to an entry of item 103 of pointer to file information is of a fixed length, the storage position indicated by the entry of item 103 of pointer to file information can be decided by using a relative position and structurally, securing of the area of item 102 of PBN on the PBN/file information conversion table 101 can therefore be unneeded.

The aforementioned Inode information table 104 (see FIG. 1) is structured as shown in FIG. 4 to store file information necessary for the present invention. The Inode information table 104 includes the item 105 of file name and the item 106 of extent information. Then, the item 106 of extent information includes an item of file division number (an item 403 of extent number), an item 404 of extent head position/block number and an item 405 of extent head position/block number. The structure of Inode information table 104 may possibly differ depending on the file system but here only items necessary at least for the present process are described. Further, for convenience of explanation, the two items 404 and 405 of extent head position/block number are indicated. For example, information concerning the file File.B is managed in the second line and information concerning the file File.B_1 is stored at the item 404 of extent head position/block number, with information concerning the file File.B-2 stored at the item 405 of extent head position/block number, so that pieces of extent information from head to end of each file are stored sequentially from the left in the Inode information table 104.

The table for managing the temporary memory region 109 (a temporary memory area managing table 501) is structured as shown in FIG. 5. The temporary memory area managing table 501 includes an item 502 of file information address, an item 503 of data temporary memory area head address and an item 504 of block number.

Stored in the item 502 of file information address are entries of head addresses of the individual entries of the item 105 of file name in the Inode information table 104 (see FIG. 4).

Stored in the item 503 of data temporary memory area head address are entries indicative of head addresses in the temporary memory region 109. For example, when a virtual memory area is allocated as an area for storing data (data temporary retention area) and a head address of the allocated temporary virtual memory area is stored in the item 503 of data temporary memory head address, data can be read/written from/to the virtual memory area by consulting the head address in the item 503 of data temporary memory head address, so that fine division of the physical memory can be unneeded and efficient use of the physical memory can be assured.

Figure 6:
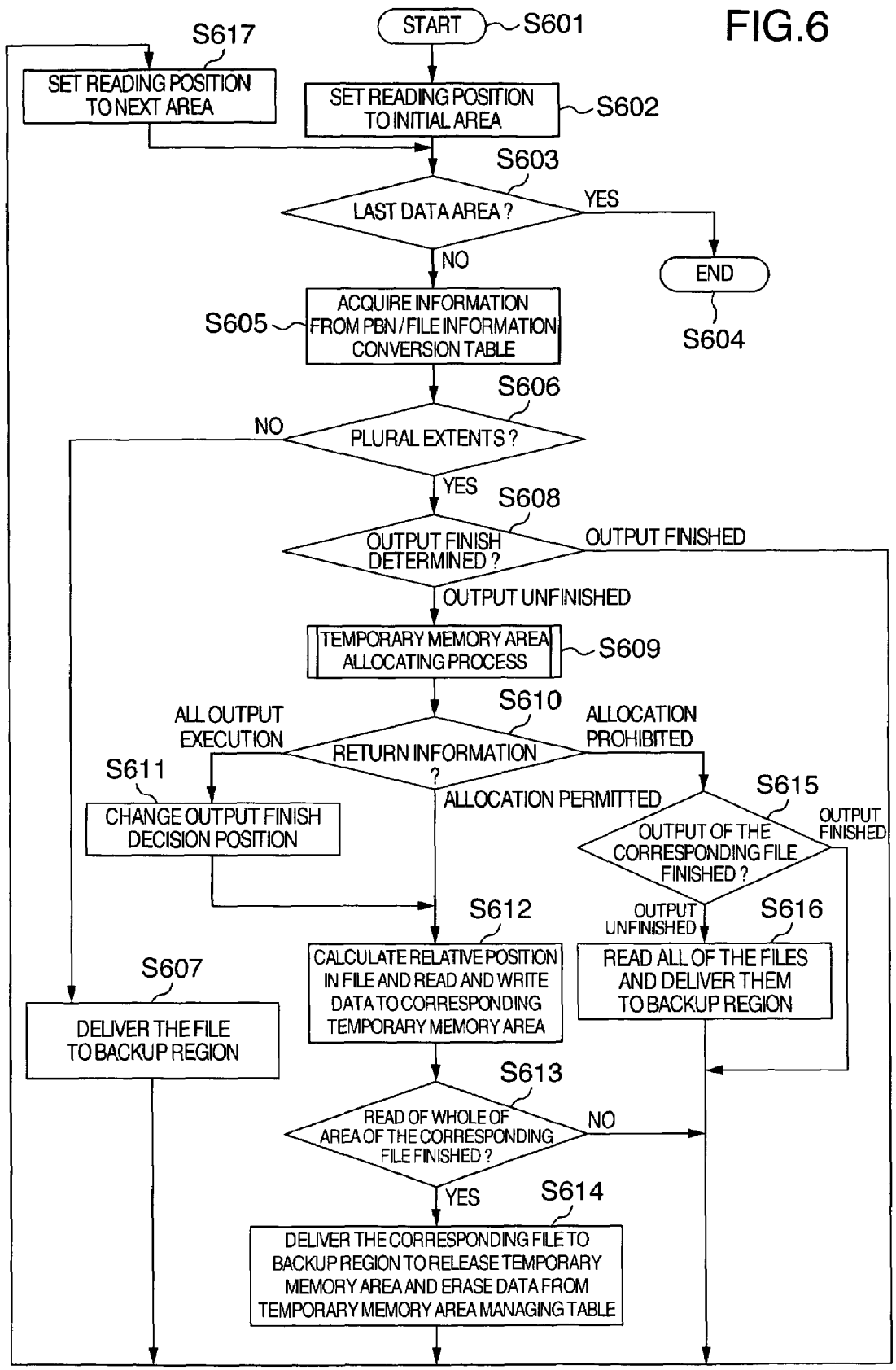
FIG. 6 is a flowchart showing the flow of a process in a backup control unit.

Referring to FIG. 6, there is illustrated a flowchart showing the flow of a process in the backup control unit 205 (see FIG. 2). The backup control unit 205 performs a process, including reading data from the data region 107 and outputting the readout data in a unit of file to the backup region 110, as will be described by making reference to FIG. 6 and also to FIGS. 1 to 5 as necessary.

Firstly, the backup control unit 205 starts a process for backup (S601) and then, sets a reading position at an initial area (S602), that is, sets the reading position to "0".

Next, the backup control unit 205 decides whether reading has proceeded up to the last area in data region 107 (S603). If reading up to the last area in data region 107 has been completed (Yes in S603), the process is ended (S604). But if reading up to the last area in data region 107 has not been complete (No in S603), information is acquired from the PBN/file information conversion table 101 (S605).

For example, on the assumption that the reading position is set to a value of "0", an entry of the item 103 of pointer to file information corresponding to an entry of the item 102 of PBN having a value of "0" is acquired from the PBN/file information conversion table 101. Since the entry of item 103 of pointer to file information has a value of "10000" at that time, a piece of file information (item 105 of file name and item 106 of extent information) among the file information pieces managed by the Inode information table 104 is acquired from an area of head address "10000". In case the head address of the file File.B is "10000", file information of the file File.B can be procured. Further, if the reading position is set to a value of, for example, "1", file information can be acquired from an area having a head address of "10004" in a similar way. In case the head address of file File.A is "10004", file information of the file File.A can be acquired.

Subsequently, the backup control unit 205 decides whether the extent is plural (S606). In other words, it is decided whether a file corresponding to data in an area set at a reading position (a corresponding file) is stored divisionally in the data region 107. Specifically, if an entry of item 403 of extent number of file information acquired in the step S605 is "1", non-division is determined but is "12" or more, division is determined. Exemplarily, if the value set as reading position is "0", file information of the file File.B can be acquired as described previously, followed by the value of item 403 of extent number being "2", and the corresponding file (File.B) is determined as being divided. Further, if the value set as reading position is, for example, "1", file information of the file File.A can be acquired as described previously, followed by the value of item 403 of extent number being "1", and the corresponding file (File.A) is determined as being undivided.

When the absence of plural extents is determined (No in S606), the backup control unit 205 delivers the file in question to the backup region 110 (S607), sets the reading position to the next area (S617) and returns to the step S603. For example, if the reading position is set to a value of "1", the file in question (File.A) is determined as being undivided as described previously and hence data at the reading position is read out of the data region 107 and delivered to the backup region 110. Since the value set as the reading position is "1" at that time, data (File.A_ 1) stored at an area designated by reading position of "1" is outputted as file File.A to the backup region 110, "1" is added to the present reading position "1" to set the reading position to "2" and the program returns to the step S603.

When it is determined that the plural extents are present (Yes in S606), the backup control unit 205 decides whether the files have all been outputted (S608). In other words, it is decided whether delivery of the files to the backup region 110 has been finished. For deciding whether the files have all been outputted (S608), an exemplary method is available according to which a recording position in data region 107 at the time that all data of the temporary memory region 109 have been outputted is recorded as an output finish decision position, the output finish decision position is compared with entries of items 404 and 405 of extent head position of the file information acquired in the step S605 and if part of the file is included at a position preceding the output finish decision position (if an extent exists at a position preceding the output finish decision position), that file is so determined as to have been outputted. For example, when the output finish decision position is set to "1" and file information (File.B) is acquired in the step S605, an extent having an entry "0" of item 405 of extent head position of file information exists (see data of File.B in FIG. 4), indicating that part of the file exists at a position preceding the output finish decision position, and delivery of the file File.B can be determined as being finished. Similarly, when the output finish decision position is set to "0" and file information (File.A) is acquired in the step S605, an extent having entries of items 404 and 405 of extent head position does not exist at a position preceding "0" (see data of File.A in FIG. 4), indicating that part of the file does not exist at a position preceding the output finish decision position, and delivery of the file File.A can be determined as being "unfinished".

When the output finish is determined (output finish in S608), the backup control unit 205 sets the reading position to the next area (S617) and returns to the step S603.

When unfinished output (unfinished output in S608) is determined, the backup control unit 205 executes a temporary memory area allocating process (S609). More specifically, a process for allocating an area at which data read out of the data region 107 is stored in the temporary memory region 109 is carried out. Details of the temporary memory area allocating process will be described later with reference to FIG. 8. Next, in step S610, the backup control unit 205 discriminates the contents of return information from the temporary memory area allocating process (S609).

When it is determined that the return information from the step S609 is for allocation prohibition (allocation prohibition in S610), the backup control unit 205 decides whether delivery of the file in question is finished. In other words, it is decided whether delivery of the file in question to the backup region 110 has been finished. For deciding whether delivery of the file in question has been finished (S615), an exemplary method is available according to which if part of the file is included at a position preceding the present reading position, delivery of that file is determined as having been finished. For example, in case the present reading position is set to "2" and file information (File.B) is acquired in the step S605, an extent having an entry "0" of item 405 of extent head position of file information exists (see data of File.B in FIG. 4), indicating that part of the file exists at a position preceding the present reading position, and "output finish" can be determined for the file File.B.

When completion of output finish of the file in question (output finish in S615) is determined, the backup control unit 205 sets the reading position to the next area (S617) and returns to the step S603.

When it is determined that delivery of the file in question has not been finished (unfinished output in S615), the backup control unit 205 reads the whole of the file in question to output it to the backup region (S616), sets the reading position to the next area (S617) and returns to the step S603. For example, when the present reading position is set to "0" and file information (File.B) is acquired in the step S605, an extent having entries "0" of items 404 and 405 of extent head position of file information does not exist (see data of File.B in FIG. 4), indicating that part of the file does not exist at a position preceding the present reading position, and "unfinished output" can be determined for the file File.B. Then, by consulting data of the file File.B in the Inode information table 104 (see FIG. 4), the backup control unit 205 sequentially reads data of the file File.B from the data region 107 (reads sequentially from the left of File.B in FIG. 4) and outputs readout data to the backup region 110. More specifically, data (File.B_1) in an area having an entry "2" of item 404 of extent head position and data (File.B_2) in an area having an entry "0" of item 405 of extent head position are read sequentially and delivered to the backup region 110.

When it is determined that the return information from the step S609 is indicative of all output execution (all output execution in S610), the backup control unit 205 changes the output finish decision position (S611). In other words, when it is determined that all files in the temporary memory region 109 have been outputted, the output finish decision position is changed to the present reading position (S611). Through this, it can be known that if an extent exists at a position preceding the output finished decision position, a file corresponding to the extent has been outputted to the backup region 110. Subsequently, the program proceeds to step S612.

When it is determined that the return information from the step S609 is indicative of allocation permission (allocation permission in S610), the backup control unit 205 proceeds to step S612.

In the step S612, the backup control unit 205 calculates a relative position in a file and reads and writes data to a corresponding area in the temporary memory region (S612). In other words, data at a reading position is read, a relative position of the data from the head of the file is determined by adding respective extent block numbers in the Inode information table 104 and the data is recorded at a corresponding position allocated to the file in the temporary memory region 109. For example, when the present reading position is set to "0" and file information (File.B) is obtained in the step S605, the backup control unit 205 reads File.B_2 from the data region 107. A relative position of the File.B_2 from the head of the file can be determined by totaling the number of blocks of extents corresponding a portion preceding the File.B_2. Since the portion preceding the File.B_2 corresponds to only File.B_1, "1" representing the block number of File.B_1 on the Inode information table 104 (see item 404 of extent head position/block number) is calculated as a total value. This total value is added to the head address of the file informed in the step S609 and a resulting address is determined as a corresponding position of the readout data.

Next, the backup control unit 205 decides whether read of the whole of area of a file is finished (S613). In other words, it is decided whether the file has all been read and written to the temporary memory region 109 in the step S612. For making a decision, a method is available according to which it is decided by consulting the Inode information table 104 whether divided data of the file is present at a position succeeding the present reading position. For example, when the present reading position is set to "2" and file information (File.B) is acquired in the step S605, the backup control unit 205 reads File.B_1 from the data region 107. An entry of extent head position of File.B_1 is "2" (see item 404 of head position/block number) and an entry of extent head position of File.B_2 is "0" (see item 405 of head position/block number). Accordingly, it is determined that the file information (File.B) does not contain divided data of the file at a position succeeding the File.B_1 (an extent having an extent head position larger than an entry "2" of extent head position of File.B_1 is not present) and the file is determined as having all been read and written to the temporary memory region 109.

When it is determined that the whole area of the file has not been read and written (No in S613), the backup control unit 205 sets the reading position to the next area (S617) and returns to the step S613.

When it is determined that the whole area of the file has been read and written (Yes in S613), the backup control unit 205 delivers the file to the backup region 110, releases the temporary memory region 109 and erases data (of the corresponding file) from the temporary memory area managing table 501 (S614). Then, the control unit sets the reading position to the next area (S617) and returns to the step S603.

Figure 7:
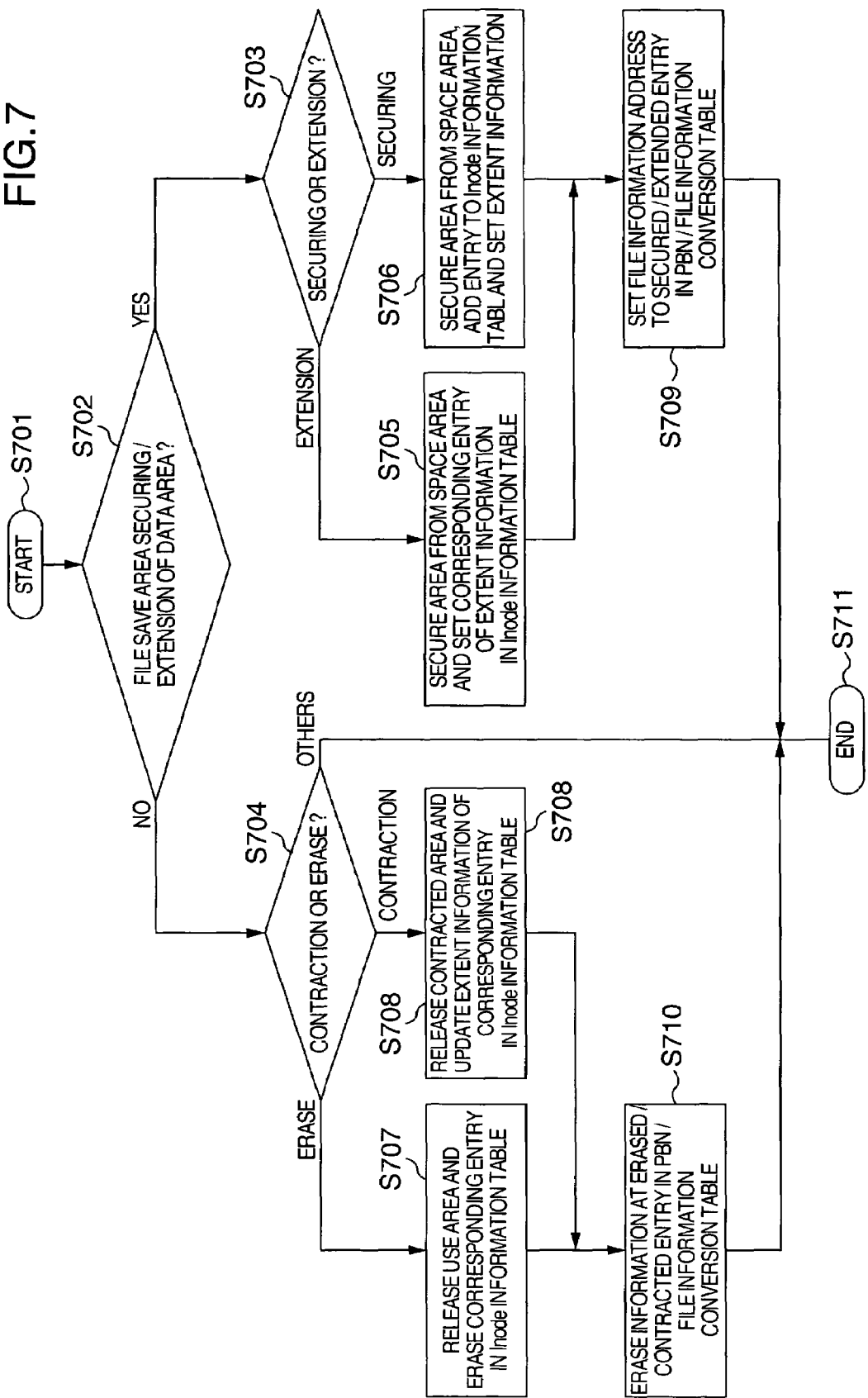
FIG. 7 is a flowchart showing the flow of a process in a file write control unit.

Turning now to FIG. 7, there is illustrated a flowchart showing the flow of a process in the file write control unit 203. A description will be given of the process the file write control unit 203 (see FIG. 2) executes with reference to FIG. 7 and also to FIGS. 1 to 5 as necessary. In this process, when a file area is subjected to such changes as securing, extension, contraction and erase, the Inode information table 104 and PBN/file information conversion table 101 are updated. Processing concerning a file area becomes necessary, the present process is carried out.

The file write control unit 203 starts a process (S701) and decides whether a securing/extension process of file area is to be carried out (S702). In the case of securing/extension process (Yes in S702), the file write control unit 203 further decides which one of securing and extension is to be executed (S703).

In the case of securing (securing in S703), the file write control unit 203 assures an area from a space area, sets entry addition and extent information 106 to the Inode information table 104 (S706), sets a file information address to an entry assured in the PBN/file information conversion table 101 (S709) and ends the process (S711). The file information address is set in the item 103 of pointer to file information in the PBN/file information conversion table 101.

In the case of extension (extension in S703), the file write control unit 203 assures an area from the space area, sets extent information of an entry of the corresponding file in the Inode information table 104 (S705), sets a file information address in an entry assured in the PBN/file information conversion table 101 (S709) and ends the process (S711). The file information address is set to the item 103 of pointer to file information in the PBN/file information conversion table 101.

In the case of non-securing/extension (No in S702), the control unit further decides which one of erase and contraction is to be executed or whether another process is to be executed (S704). In the case of erase, the use area is released, the corresponding entry in the Inode information table 104 is erased (S707), a file information address of an erased/contracted entry in the PBN/file information conversion table 101 is erased (S710) and the process is ended (S711). The file information address is erased from the item 103 of pointer to file information in the PBN/file information conversion table 101.

In the case of contraction, a contracted area is released, extension information of the corresponding entry in the Inode information table 104 is updated (S708), a file information address of the erased/contracted entry in the PBN/file information conversion table 101 is erased (S710) and the process is ended (S711). The file information address is erased from the item 103 of pointer to file information in the PBN/file information conversion table 101.

Figure 8:
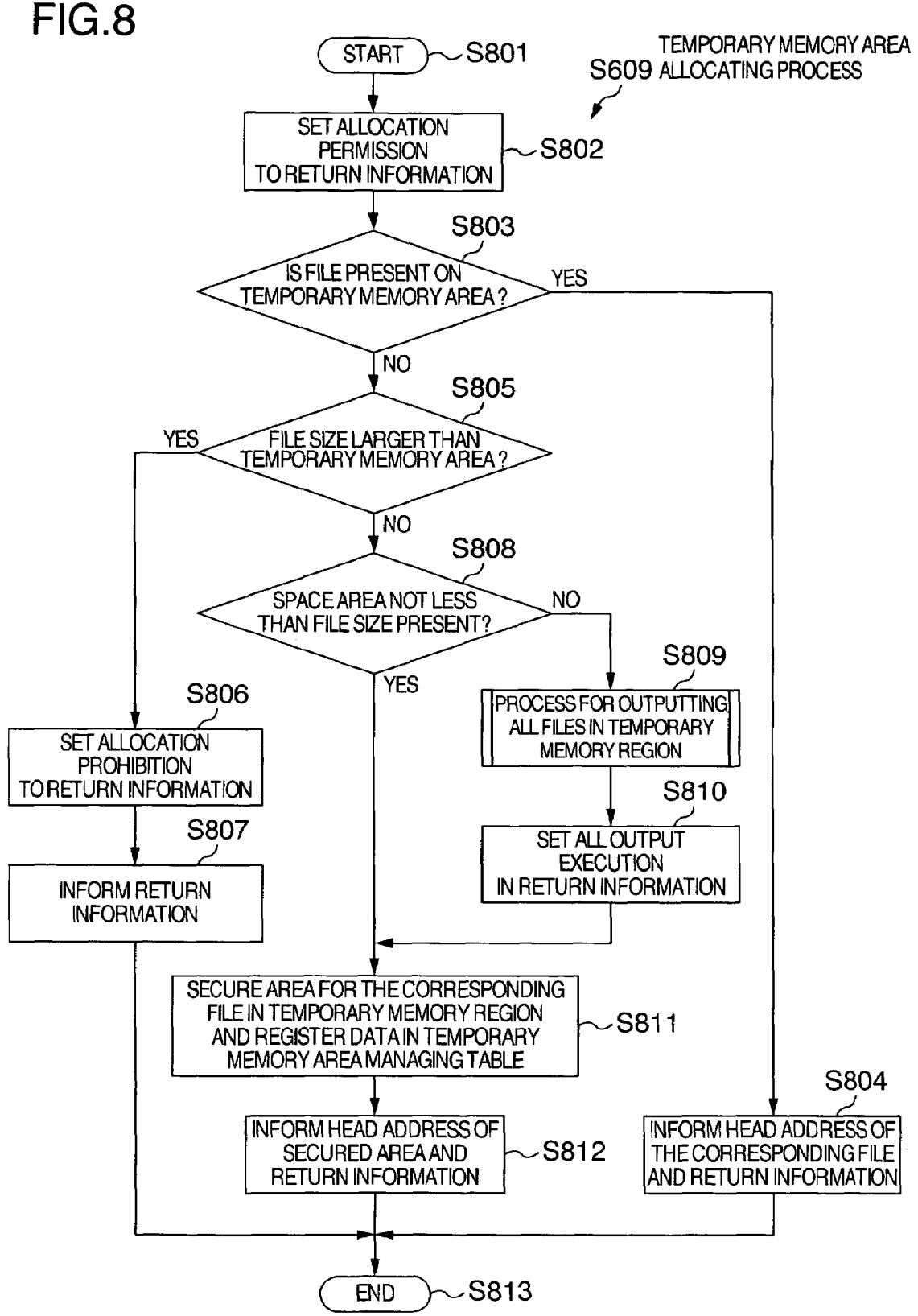
FIG. 8 is a flowchart showing the flow of a process in a temporary memory control unit.

Referring to FIG. 8, there is illustrated a flowchart showing the flow of a process in the temporary memory control unit 204. A process the temporary memory control unit 204 (see FIG. 2) executes will be explained with reference to FIG. 8 and also to FIGS. 1 to 5 as necessary. In this process, the temporary memory area allocating process (S609) explained in connection with FIG. 6 will be detailed.

The temporary memory control unit 204 starts a process (S801), sets allocation permission to return information (S802) and decides whether a file is present in the temporary memory region 109 (S803). In other words, it is decided whether a file corresponding to data at a reading position exists in the temporary memory region 109. In an available method for this purpose, it is decided whether an entry of item 502 of file information address of the corresponding file exists in the temporary memory area managing table 501.

When determining the presence of the file on the temporary memory region 109 (Yes in S803), the temporary memory control unit 204 informs a head address of the file and return information (S804) and ends the process (S813).

When determining the absence of any file on the temporary memory region 109 (No in S803), the temporary memory control unit 204 decides whether the size of a file is larger than the area size in the temporary memory region 109 (S805). In the case of the file size being larger than the area size in the temporary memory region 109 (Yes in S805), allocation prohibition is set to the return information (S806), the return information is informed (S807) and the process is ended (S813).

In the case of the file size being less than the area size in the temporary memory region 109 (No in S805), the temporary memory control unit 204 decides in step S809 whether a space area in excess of the file size is present (in the temporary memory region 109). In a method of calculating the file size (necessary capacity), the file size can be calculated by totaling entries of items of extent block number in the Inode information table 104.

When the absence of a space area in excess of the file size is determined (No in S808), the temporary memory control unit 204 carries out a process for delivering all files in the temporary memory region (S809) and sets all output delivery execution in the return information (S810). The process for delivering all files in the temporary memory region will be detailed later with reference to FIG. 9. Through this process, data pieces of files assured on the temporary memory region 109 are all read sequentially and delivered to the backup region 110, so that with a space area assured in the temporary memory region 109, the program proceeds to step S811.

When the presence of a space area in excess of the file size is determined (Yes in S808), the temporary memory control unit 204 assures an area for the file in question in the temporary memory region 109 and registers data in the temporary memory area managing table 501 (S811). Then, the control unit informs a head address of the assured area and return information (S812) and ends the process (S813). As necessary (for example, on the basis of a calculated file size), by allotting an area of virtual storage in a memory region of a disk, for instance, and performing recording on the disk in a sequentially readable fashion, improvements in performance and securing of a larger area can be realized. In this case, if an address of the virtual memory area is stored in an entry of item 503 of data temporary memory area head address, data in the virtual memory area can be read and written by consulting the entry of item 503 of data temporary area head address.

It will be appreciated that if the temporary memory region 109 has a sufficiently large capacity, procedures in the steps S610, S611, S615, S616 and S805 to S810 can be dispensed with.

Figure 9:
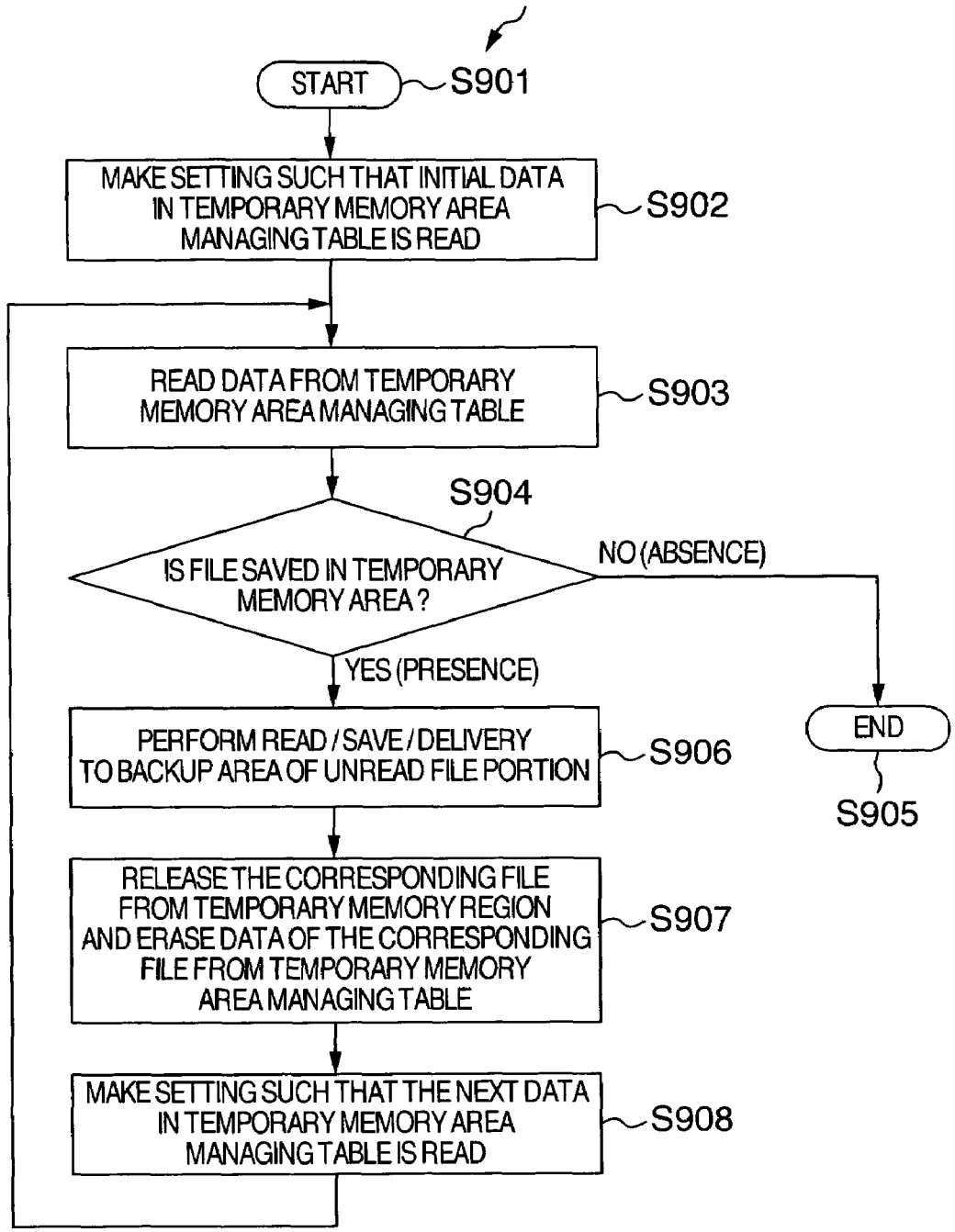
FIG. 9 is a flowchart showing the flow of a process for delivering all files present in the temporary memory region carried out by the temporary memory control unit.

Referring now to FIG. 9, there is illustrated a flowchart showing the flow of a process for delivering all files in the temporary memory region by the temporary memory control unit 204 (see FIG. 2) as in the step S809 in FIG. 8. A process for delivering all pieces of information in the temporary memory region 109 to the backup region 110 in the event that the temporary memory region 109 is in shortage of capacity will be described with reference to FIG. 9 and also to FIGS. 1 to 5 as necessary. In this process, the process for delivering all files in the temporary memory region (S809) explained in connection with FIG. 8 will be detailed.

Firstly, the temporary memory control unit 204 starts in step S901 a process for delivering all files in the temporary memory region (S809). Then, the temporary memory control unit 204 makes setting such that initial data in the temporary memory area managing table 501 can be read (S902). The temporary memory control unit 204 reads data out of the temporary memory area managing table 501 (S903) and decides whether no file retains in the temporary memory region 109 (S904).

When the absence of any retained file in the temporary memory area 109 (completion of reading of all data in the temporary memory area managing table 501) is determined (No in S904), the temporary memory control unit 204 ends the process (S905).

When the presence of a retained file in the temporary memory region 109 (the presence of any unread data in the temporary memory area managing table 501) is determined (Yes in S904), the temporary memory control unit 204 executes a process to be applied to an unread file portion for reading/retaining it or delivering it to the backup region (S906). In other words, at the time that an unread portion of a file corresponding to data read out of the temporary area managing table 501 is read out of the data region 107 and all pieces of information of the file are present, the temporary memory control unit 204 delivers the information to the backup region 110. For reading the unread portion of the file from the data region 107, a method for reading data is conceivable according to which an entry of item 502 of file information address in temporary memory area arranging table 501 corresponding to readout data is used to consult entries of items 404 and 405 of extent head position of the Inode information table 104 and an extent existing at a position succeeding the present reading position is determined to be unread.

The temporary memory control unit 204 releases the file from the temporary memory region 109, erases the data of the file from the temporary memory area managing table 501 (S907), makes setting such that the next data of the temporary memory area managing table 501 is to be read (S908) and returns to the step S903.

Figure 10:
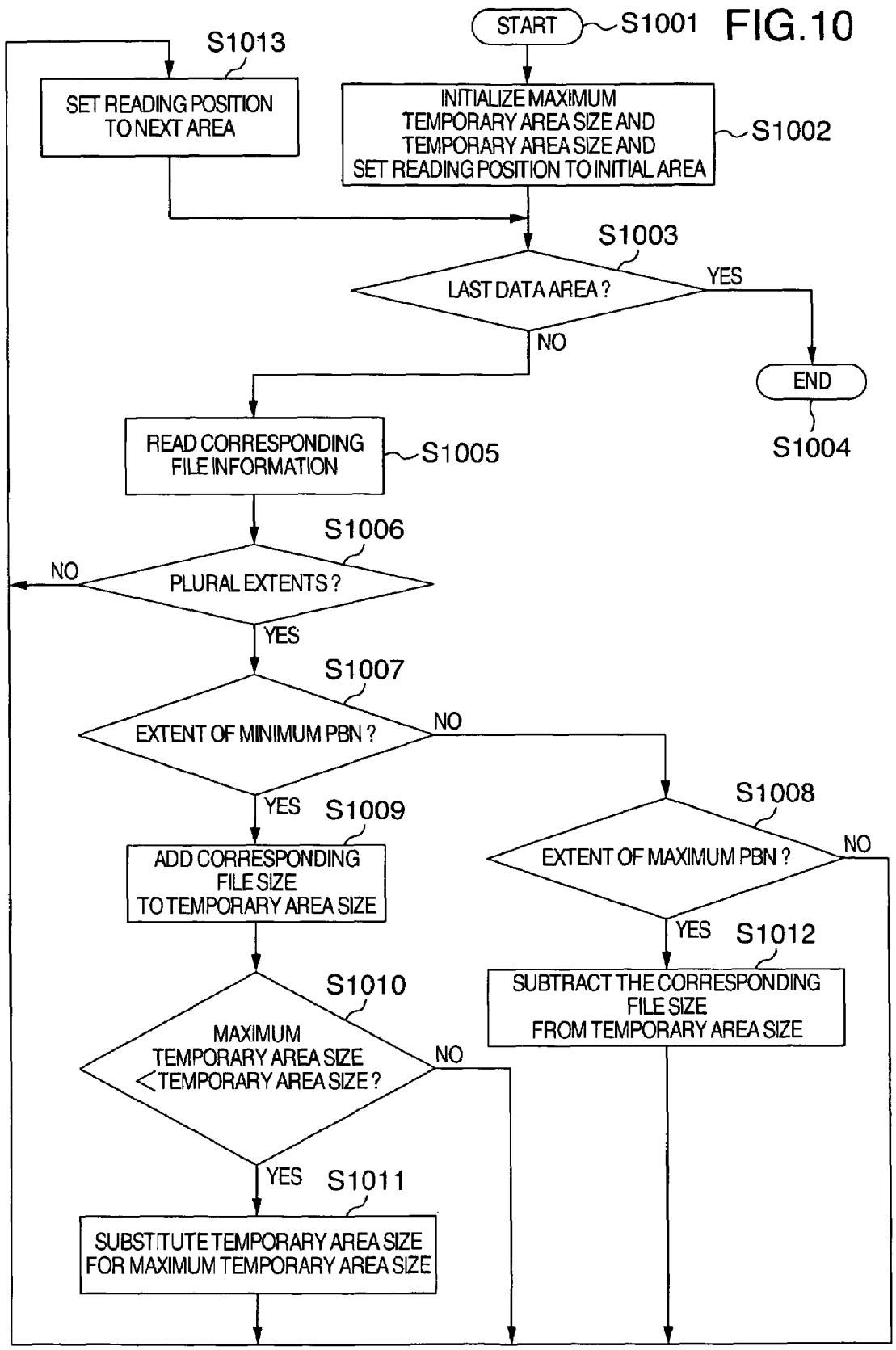
FIG. 10 is a flowchart showing the flow of a process in a temporary memory area use amount calculating unit.

Referring to FIG. 10, there is illustrated a flowchart showing the flow of a process in the temporary memory area use amount calculating unit 206 (see FIG. 2). A process for delivering the maximum size needed for the temporary memory area will be described with reference to FIG. 10 and also to FIGS. 1 to 5 as necessary. In this process, the temporary memory area use amount calculating unit 206 reads pieces of information of files in question sequentially from the head of data region 107 by utilizing the PBN/file information conversion table 101 to thereby determine a necessary temporary memory area. This ensures that a necessary size of temporary memory area can be calculated in advance.

Firstly, the temporary memory area use amount calculating unit 206 starts a process for calculating the use amount of temporary memory area (S1001). Then, the calculating unit initializes the maximum temporary area size and temporary area size (area for recording) and sets a reading position to the first area (S1002).

Subsequently, the temporary memory area use amount calculating unit 206 decides whether reading up to the last of data region 107 has been finished (S1003). In the case of finish of reading of the last of the data area (in case data have all been read) (Yes in S1003), the calculating unit ends the process (S1004). If reading up to the last has not yet been finished, file information (entries of items 105 and 106 of file name and extent information) in question is read (S1005) and it is decided in step S1006 whether data at the reading position is plural extents (by consulting an entry of item 403 of extent number).

When it is determined that the data at the reading position is not of plural extents (No in S1006), followed by non-use of the temporary memory area 109, the temporary memory area use amount calculating unit 206 sets the reading position to the next area (S1013) and returns to the step S1003.

When it is determined that the data at the reading position is of plural extents (Yes in S1006), the temporary area use amount calculating unit 206 decides whether the data at the reading position is an extent being extents of the corresponding file and for which the minimum PBN is recorded (S1007). In other words, it is decided whether the data at the reading position is an extent to be set for the first reading position among the extents of the file (an extent having the minimum entries of items 404 and 405 of head position among the extents of the file).

When it is determined that data at the reading position is an extent of the minimum PBN (Yes in S1007), the temporary memory area use amount calculating unit 206 adds the file size to the temporary area size (S1009) and decides whether the maximum temporary area size is smaller than the temporary memory area size (S1010). The addition of the file size to the temporary area size is carried out herein because when the extent of the minimum PBN is read and written to the temporary memory region 109, an area of the corresponding file size is assured in the temporary memory region 109 and the use amount in the temporary memory region 109 increases by the corresponding amount.

When it is determined that the maximum temporary area size is in excess of the temporary memory size (No in S1010), the temporary memory area use amount calculating unit 206 sets the reading position to the next area (S1013) and returns to the step S1003.

Further, when it is determined that the maximum temporary area size is smaller than the temporary memory area size (Yes in S1010), the temporary memory area use amount calculating unit 206 replaces the maximum temporary area size with the temporary area size (S1011), sets the reading position to the next area (S1013) and returns to the step S1003.

When it is determined that the data at the reading position is not an extent of the minimum PBN (No in S1007), the temporary memory area use amount calculating unit 206 decides in step S1008 whether the data at the reading position is an extent recorded with the maximum PBN among the extents of the file and recorded with the maximum PBN. In other words, it is decided whether the data at the reading position is an extent being among the extents of the file and set at the last reading position (an extent having entries of the maximum value of items 404 and 405 of extent head position among the extents of the file).

When it is determined that the data at the reading position is not an extent of the maximum PBN (No in S1008), the temporary memory area use amount calculating unit 206 sets the reading position in the next area (S1013) and returns to the step S1003.

When an extent of the maximum PBN is determined (Yes in S1008), the temporary memory area use amount calculating unit 206 subtracts the file size from the temporary area size (S1012), sets the reading position to the next area (S1013) and returns to the step S1003. The subtraction of the file size from the temporary area size is effected here because after the extent of the maximum PBN is read and written to the temporary memory region 109, an area corresponding to the file size is released from the temporary memory region 109 and the use amount in the temporary memory region 109 decreases correspondingly.

Through the above process, the temporary memory area use amount calculating unit 206 can calculates a necessary size of temporary memory area in advance. For example, when the backup control unit 205 calls the temporary memory area use amount calculating unit 206 after the step S601 and on the basis of a calculation result of a necessary size in the temporary memory area 109 by the temporary memory area use amount calculating unit 206, performs control such that procedures in the aforementioned steps S610, S611, S615, S616 and S805 to S810 are not carried out, the processing time can be reduced. To carry out the process for deciding whether the data at the reading position is an extent of the maximum PBN (S1008), it is conceivable to use the same method as that for the process of deciding whether reading of all areas has been finished in respect of the file explained in connection with the step S613. Further, use of a similar method can be conceivable as a method for the process of deciding whether the extent is the minimum PBN (S1007).

Second Embodiment

In the present embodiment, the function of the server explained in the first embodiment is incorporated into the function of a disk device to permit the disk device to have the backup function. On presupposition of a system in which by incorporating the function to manage a volume and a file system into the disk device, a file system can be made up on the volume from a portion accessing the disk device, the contents of the first embodiment is incorporated into the system to ensure that while the disk being read sequentially, the master of the disk device can read data and file information in a unit of file.

Figure 11:
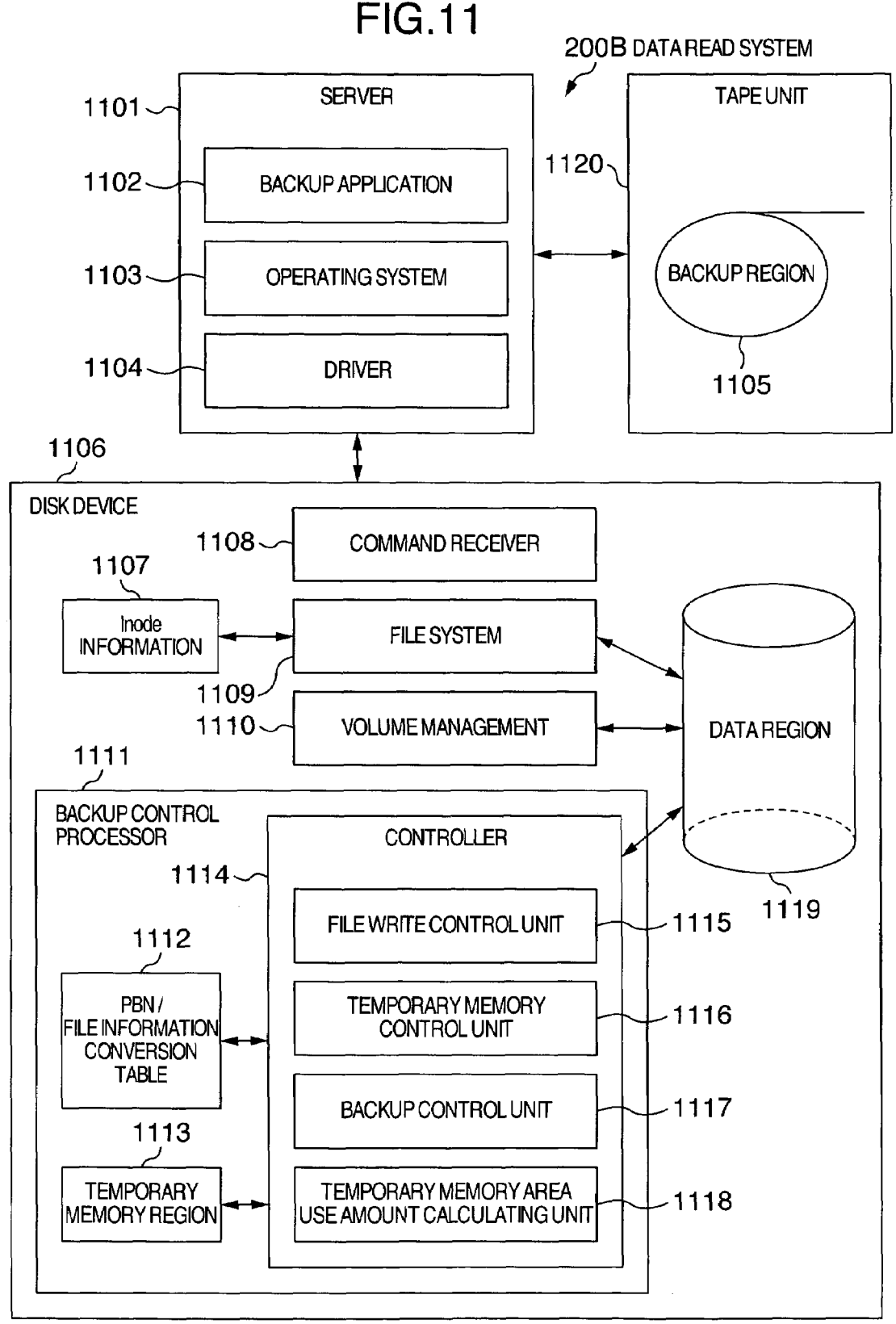
FIG. 11 is a diagram useful to explain the overall construction of a data read system according to a second embodiment of the invention.

The overall construction of a data read system (second embodiment) will be described with reference to FIG. 11. A data read system 200B comprises a server 1101, a disk device 1106 and a tape unit 1120.

Structurally, in the server 1101, a backup application 1102 operates on an operating system 1103 but a file system 1109 representing part of the function the operating system 1103 has is on the side of disk device 1106 and hence access to the file system 1109 is effected through a driver 1104. Then, the backup application 1102 delivers, in a unit of file, data acquired through the driver 1104 to a backup region 1105 of tape unit 1120.

In the disk device 1106, a command receiver 1108 receives a command from the driver 1104 to access a data region 119 through the file system 1109 having metadata related to files such as Inode information 1107. A PBN/file information conversion table 1112 and a temporary memory region 1113 in a backup control processor 1111 are constructed similarly to the PBN/file information conversion table 101 and temporary memory region 109, respectively, explained in connection with the first embodiment. Further, a controller 1114 in backup control processor 1111 (including file write control unit 1115, temporary memory control unit 1116, backup control unit 1117 and temporary memory area use amount calculating unit 1118) has a function similar to that of the controller 202 explained in connection with the first embodiment to ensure that data reading and file information reading can be effected in a unit of file. In addition, the disk device 1106 is also constructed so as to have the function to manage the volume by having a volume management 1110.

Protocol corresponding to NDMP (Network Data Management Protocol) is inputted/outputted between the backup application 1102 and driver 1104 in server 1101 and the command receiver 1108 in disk device 1106 to input/output file information and file data, so that the disk can be accessed sequentially to perform backup in a unit of file.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system for reading data to effect a backup operation, comprising:
- a disk device including a data region for storing data representing read targets, wherein the data is stored as data pieces;
- a tape unit including a backup region for storing backup data; and
- a data read apparatus for reading data in said data region, and outputting the data as backup data to said backup region, wherein
- said disk device manages file information pieces concerning files corresponding to the data pieces stored in said data region and also position information of the file information pieces concerning the files, and
- said data read apparatus includes a processor and a temporary memory region for temporarily storing at least some of the data pieces read out of said data region before the at least some of the data pieces are outputted to said backup region, and wherein when sequentially reading out sequential data pieces in an area of said data region to effect the backup operation, the system sequentially determines whether each handled sequential data piece is a single data piece of an undivided non-plural-extent file or is one of plural data pieces of a divided plural-extent file, and
- the system outputs the handled sequential data piece determined as the single data piece of the undivided non-plural-extent file, to said backup region, without temporarily storing the handled sequential data piece in the temporary memory region, and for the handled sequential data piece determined as one of plural data pieces of the divided plural-extent file:
- said processor uses a reading position of the handled sequential data piece in said data region to determine, from the file information pieces, a file information piece corresponding to the handled sequential data piece, consults the file information piece to calculate an output position in said temporary memory region to which the handled sequential data piece should be stored to reconstruct the divided plural-extent file with proper sequential data piece ordering, stores the handled sequential data piece read out of said data area to said calculated output position in said temporary memory region, decides whether all the plural data pieces of the divided plural-extent file are all stored in the proper sequential data piece ordering in said temporary memory region to reconstitute the divided plural-extent file as a complete file formed of sequential data pieces in said temporary memory region, and responsive to deciding that the plural data pieces of the divided plural-extent file are all stored in the proper sequential data piece ordering in said temporary memory region to reconstitute the divided plural-extent file as a complete file formed of sequential data pieces in said temporary memory region, outputs said plural data pieces of the complete file to said backup region sequentially as a file unit, wherein said processor allocates each of the sequential data pieces to the output position of the temporary memory region corresponding to the same relative position of each of the sequential data pieces to each other in the data region.

2. The system according to claim 1, wherein said data read apparatus further manages pieces of information for managing said temporary memory region, said information for managing said temporary memory region including head address information on file areas each secured in said temporary memory region, and wherein
- said processor consults the head address information on a file area secured in said temporary memory region to decide whether a file corresponding to data read out of said data area exists in said temporary memory region;
- when absence of the corresponding file in said temporary memory region is determined, said processor secures an area for the corresponding file in said temporary memory region, registers a head address of the secured area in the head address information of the corresponding file assured in said temporary memory region, and calculates the output position by adding a relative position in the corresponding file to the head address of the secured area; and
- when presence of the corresponding file in said temporary memory region is determined, said processor consults a head address of the corresponding file secured in an area of said temporary memory region to acquire the head address of the corresponding file secured in said temporary memory region, and calculates said output position by adding the relative position in the corresponding file to the acquired head address of the corresponding file.

3. The system according to claim 2, wherein the information pieces concerning the files managed by said disk device includes a head position of a data piece existing in said data area and the number of blocks of said data pieces, and wherein
- when securing an area of the corresponding file in said temporary memory region, said processor calculates a file size by totaling block numbers of said data and secures, as an area of the file, an area corresponding to the calculated file size in said temporary memory region;
- when calculating the relative position in said file, consults the head position of said data to totalize cumulative block numbers of that part of the data of the corresponding file which exists at a position preceding the data at said reading position so as to calculate the relative position in said file; and
- when deciding whether files corresponding to outputted data are all present in said temporary memory region, consults the head position of said data to determine that the files corresponding to the outputted data are all present in said temporary memory region if the data exists at the last position of said reading position from among the data of the corresponding files.

4. The system according to claim 3, wherein the information for managing said temporary memory region further includes position information of information concerning said files, and wherein
- when securing an area corresponding to said calculated file size as an area of the file in said temporary memory region, said processor compares said calculated file size with a temporary memory area size and if determining that said calculated file size is larger than said temporary memory area size, consults the head position of said data to read, from said data area, all of data of the file corresponding to data at said reading position and delivers the files in a unit of file to said backup region by using the relative position of data calculated by totaling said block numbers of data;

when comparing said calculated file size with a space size in said temporary memory region to determine that said calculated file size is larger than said space size in said temporary memory region, acquires information concerning said file specified by the position information of information concerning said file included in information for managing the temporary memory region, consults the head position of said data in the information concerning said file to read all data of the file corresponding to data existing in said temporary memory region and delivers said files in a unit of file to said backup region by using the relative position of data calculated by totaling the block numbers of said data; and when determining that the calculated file size is smaller than said temporary memory area size and the calculated file size is smaller than the space size in said temporary memory region, secures an area of said calculated file size as an area of file in said temporary memory region.

5. The system according to claim 4, wherein before reading data in said data region sequentially, said processor calculates a temporary memory area use amount corresponding to the maximum one of use amounts in said temporary memory region used when data in said data region are read sequentially; and if the temporary memory area use amount is larger than a size of said temporary memory region, compares said calculated file size with the size of said temporary memory region when reading data in said data region sequentially.

6. A data read backup apparatus to effect a backup operation, comprising:
  a disk device including a data region for storing data representing read targets, wherein the data is stored as data pieces;
  a tape unit including a backup region for storing backup data; and
  a data read apparatus for reading data in said data region, and outputting the data as backup data to said backup region, wherein
  said disk device manages file information pieces concerning files corresponding to the data pieces stored in said data region and also position information of the file information pieces concerning the files, and
  said data read apparatus includes a processor and a temporary memory region for temporarily storing at least some of the data pieces read out of said data region before the at least some of the data pieces are outputted to said backup region, and wherein when sequentially reading out sequential data pieces in an area of said data region to effect the backup operation, the system sequentially determines whether each handled sequential data piece is a single data piece of an undivided non-plural-extent file or is one of plural data pieces of a divided plural-extent file, and
  the system outputs the handled sequential data piece determined as the single data piece of the undivided non-plural-extent file, to said backup region, without temporarily storing the handled sequential data piece in the temporary memory region, and for the handled sequential data piece determined as one of plural data pieces of the divided plural-extent file:
  said processor uses a reading position of the handled sequential data piece in said data region to determine, from the file information pieces, a file information piece corresponding to the handled sequential data piece, consults the file information piece to calculate an output position in said temporary memory region to which the handled sequential data piece should be stored to reconstruct the divided plural-extent file with proper sequential data piece ordering, stores the handled sequential data piece read out of said data area to said calculated output position in said temporary memory region, decides whether all the plural data pieces of the divided plural-extent file are all stored in the proper sequential data piece ordering in said temporary memory region to reconstitute the divided plural-extent file as a complete file formed of sequential data pieces in said temporary memory region, and responsive to deciding that the plural data pieces of the divided plural-extent file are all stored in the proper sequential data piece ordering in said temporary memory region to reconstitute the divided plural-extent file as a complete file formed of sequential data pieces in said temporary memory region, outputs said plural data pieces of the complete file to said backup region sequentially as a file unit,
  wherein said processor allocates each of the sequential data pieces to the output position of the temporary memory region corresponding to the same relative position of each of the sequential data pieces to each other in the data region.

7. The data read backup apparatus according to claim 6, wherein said data read apparatus further manages pieces of information for managing said temporary memory region, said information for managing said temporary memory region including head address information on file areas each secured in said temporary memory region, and wherein
  said processor consults the head address information on a file area secured in said temporary memory region to decide whether a file corresponding to a data piece read out of said data area exists in said temporary memory region;
  when absence of the corresponding file in said temporary memory region is determined, said processor secures an area for the corresponding file in said temporary memory region, registers a head address of the secured area in the head address information of the corresponding file secured in said temporary memory region, and calculates the output position by adding a relative position in the corresponding file to the head address of the secured area; and
  when presence of the corresponding file in said temporary memory region is determined, said processor consults a head address of the corresponding file secured in an area of said temporary memory region to acquire the head address of the corresponding file secured in said temporary memory region, and calculates said output position by adding the relative position in the corresponding file to the acquired head address of the corresponding file.

8. The data read backup apparatus according to claim 7, wherein the information pieces concerning the files managed by said disk device include a head position of a data piece existing in said data area and the number of blocks of said data pieces, and wherein
  when securing an area of the corresponding file in said temporary memory region, said processor calculates a file size by totaling block numbers of said data piece and secures, as an area of the file, an area corresponding to the calculated file size in said temporary memory region;
  when calculating the relative position in said file, consults the head position of said data piece to totalize cumulative block numbers of that part of the data of the corresponding file which exists at a position preceding the data at said reading position so as to calculate the relative position in said file; and
  when deciding whether files corresponding to outputted data are all present in said temporary memory region, consults the head position of said data to determine that the files corresponding to the outputted data are all present in said temporary memory region if the data exists at the last position of said reading position from among the data of the corresponding files.

9. The data read backup apparatus according to claim 8, wherein the information for managing said temporary memory region further includes position information of information concerning said files, and wherein when securing an area corresponding to said calculated file size as an area of the file in said temporary memory region, said processor compares said calculated file size with a temporary memory area size and if determining that said calculated file size is larger than said temporary memory area size, consults the head position of said data to read, from said data area, all of data of the file corresponding to data at said reading position and delivers the files in a unit of file to said backup region by using the relative position of data calculated by totaling said block numbers of data;

when comparing said calculated file size with a space size in said temporary memory region to determine that said calculated file size is larger than said space size in said temporary memory region, acquires information concerning said file specified by the position information of information concerning said file included in information for managing the temporary memory region, consults the head position of said data in the information concerning said file to read all data of the file corresponding to data existing in said temporary memory region and delivers said files in a unit of file to said backup region by using the relative position of data calculated by totaling the block numbers of said data; and when determining that the calculated file size is smaller than said temporary memory area size and the calculated file size is smaller than the space size in said temporary memory region, secures an area of said calculated file size as an area of file in said temporary memory region.

10. The data read backup apparatus according to claim 9, wherein before reading data in said data region sequentially, said processor calculates a temporary memory area use amount corresponding to the maximum one of use amounts in said temporary memory region used when data in said data region are read sequentially; and if the temporary memory area use amount is larger than a size of said temporary memory region, compares said calculated file size with the size of said temporary memory region when reading data in said data region sequentially.

11. A method for reading and backing up data in a data read system having a disk device including a data region for storing data representing read targets, wherein the data is stored as data pieces, a tape unit including a backup region for storing backup data, and a data read apparatus for reading data in said data region, and outputting the data as backup data to said backup region, where said data read apparatus includes a processor and a temporary memory region for temporarily storing at least some of the data pieces read out of said data region before the at least some of the data pieces are outputted to said backup region, the method comprising:

managing file information pieces concerning files corresponding to the data pieces stored in said data region and also position information of the file information pieces concerning the files, when sequentially reading out sequential data pieces in an area of said data region to effect the backup operation, determining whether each handled sequential data piece is a single data piece of an undivided non-plural-extent file or is one of plural data pieces of a divided plural-extent file, and outputting the handled sequential data piece determined as the single data piece of the undivided non-plural-extent file, to said backup region, without temporarily storing the handled sequential data piece in the temporary memory region, and for the handled sequential data piece determined as one of plural data pieces of the divided plural-extent file:

using a reading position of the handled sequential data piece in said data region to determine, from the file information pieces, a file information piece corresponding to the handled sequential data piece, consulting the file information piece to calculate an output position in said temporary memory region to which the handled sequential data piece should be stored to reconstruct the divided plural-extent file with proper sequential data piece ordering, storing the handled sequential data piece read out of said data area to said calculated output position in said temporary memory region, deciding whether all the plural data pieces of the divided plural-extent file are all stored in the proper sequential data piece ordering in said temporary memory region to reconstitute the divided plural-extend file as a complete file formed of sequential data pieces in said temporary memory region, and responsive to deciding that the plural data pieces of the divided plural-extent file are all stored in the proper sequential data piece ordering in said temporary memory region to reconstitute the divided plural-extent file as a complete file formed of sequential data pieces in said temporary memory region, outputting said plural data pieces of the complete file to said backup region sequentially as a file unit, wherein each of the sequential data pieces is allocated to the output position of the temporary memory region corresponding to the same relative position of each of the sequential data pieces to each other in the data region.

12. The method according to claim 11, wherein said data read apparatus further manages pieces of information for managing said temporary memory region, said information for managing said temporary memory region including head address information on file areas each secured in said temporary memory region, and wherein said processor consults the head address information of a file area secured in said temporary memory region to decide whether a file corresponding to data read out of said data area exists in said temporary memory region;

when absence of the corresponding file in said temporary memory region is determined, said processor secures an area of the corresponding file in said temporary memory region, registers a head address of the secured area in the head address information of the corresponding file secured in said temporary memory region, and calculates the output position by adding a relative position in the corresponding file to the head address of the secured area; and when presence of the corresponding file in said temporary memory region is determined, said processor consults a head address of the corresponding file secured in an area of said temporary memory region to acquire the head address of the corresponding file secured in said temporary memory region, and calculates said output position by adding the relative position in the corresponding file to the acquired head address of the corresponding file.

13. The method according to claim 12, wherein the information pieces concerning the files managed by said disk device includes the head position of data existing in said data area and a number of blocks of said data pieces, and wherein when securing an area of the corresponding file in said temporary memory region, said processor calculates a file size by totaling block numbers of said data and secures, as an area of the file, an area corresponding to the calculated file size in said temporary memory region;

when calculating the relative position in said file, consults the head position of said data to totalize cumulative block numbers of that part of the data of the corresponding file which exists at a position preceding the data at said reading position so as to calculate the relative position in said file; and when deciding whether files corresponding to outputted data are all present in said temporary memory region, consults the head position of said data to determine that the files corresponding to the outputted data are all present in said temporary memory region if the data exists at the last position of said reading position from among the data of the corresponding files.

14. The method according to claim 13, wherein the information for managing said temporary memory region further includes position information of information concerning said files, and wherein when securing an area corresponding to said calculated file size as an area of the file in said temporary memory region, said processor compares said calculated file size with a temporary memory area size and if determining that said calculated file size is larger than said temporary memory area size, consults the head position of said data to read, from said data area, all of data of the file corresponding to data at said reading position and delivers the files in a unit of file to said backup region by using the relative position of data calculated by totaling said block numbers of data;

when comparing said calculated file size with a space size in said temporary memory region to determine that said calculated file size is larger than said space size in said temporary region, acquires information concerning said file specified by the position information of information concerning said file included in information for managing the temporary memory region, consults the head position of said data in the information concerning said file to read all data of the file corresponding to data existing in said temporary memory region and delivers said files in a unit of file to said backup region by using the relative position of data calculated by totaling the block numbers of said data; and when determining that the calculated file size is smaller than said temporary memory area size and the calculated file size is smaller than the space size in said temporary memory region, secures an area of said calculated file size as an area of file in said temporary memory region.

15. The method according to claim 14, wherein before reading data in said data region sequentially, said processor calculates a temporary memory area use amount corresponding to the maximum one of use amounts in said temporary memory region used when data in said data region are read sequentially; and if the temporary memory area use amount is larger than a size of said temporary memory region, compares said calculated file size with the size of said temporary memory region when reading data in said data region sequentially.

16. A system for reading data to effect a backup operation, comprising:

a disk device including a data region for storing data representing read targets, wherein the data is stored as data pieces;

a tape unit including a backup region for storing backup data; and a data read apparatus for reading data in said data region, and outputting the data as backup data to said backup region, wherein said disk device manages file information pieces concerning files corresponding to the data pieces stored in said data region, and also position information of the file information pieces concerning the files, and said data read apparatus includes a processor and a temporary memory region for temporarily storing at least some of the data pieces read out of said data region before the at least some of the data pieces are outputted to said backup region, and wherein when sequentially reading out sequential data pieces in an area of said data region to effect the backup operation, the system sequentially determines whether each handled sequential data piece is a single data piece of an undivided non-plural-extent file or is one of plural data pieces of a divided plural-extent file, and the system outputs the handled sequential data piece determined as the single data piece of the undivided non-plural-extent file, to said backup region, without temporarily storing the handled sequential data piece in the temporary memory region, and for the handled sequential data piece determined as one of plural data pieces of the divided plural-extent file:

said processor uses a reading position of the handled sequential data piece in said data region to determine, from the file information pieces, a file information piece corresponding to the handled sequential data piece, consults the file information piece to calculate an output position in said temporary memory region to which the handled sequential data piece should be stored to reconstruct the divided plural-extent file with proper sequential data piece ordering so that pieces of extent information from head to end of the divided plural-extent file are stored sequentially in said temporary memory region, stores the handled sequential data piece read out of said data area to said calculated output position in said temporary memory region so that the data pieces from head to end of the divided plural-extent file are stored sequentially in said temporary memory region, decides whether all the plural data pieces of the divided plural-extent file are all stored in the proper sequential data piece ordering in said temporary memory region to reconstitute the divided plural-extent file as a complete file formed of sequential data pieces in said temporary memory region, and responsive to deciding that the plural data pieces of the divided plural-extent file are all stored in the proper sequential data piece ordering in said temporary memory region to reconstitute the divided plural-extent file as a complete file formed of sequential data pieces in said temporary memory region, outputs said plural data pieces of the complete file to said backup region sequentially as a file unit, wherein said processor allocates each of the sequential data pieces to the output position of the temporary memory region corresponding to the same relative position of each of the sequential data pieces to each other in the data region.

* * * * *